UNITED STATES PATENT OFFICE.

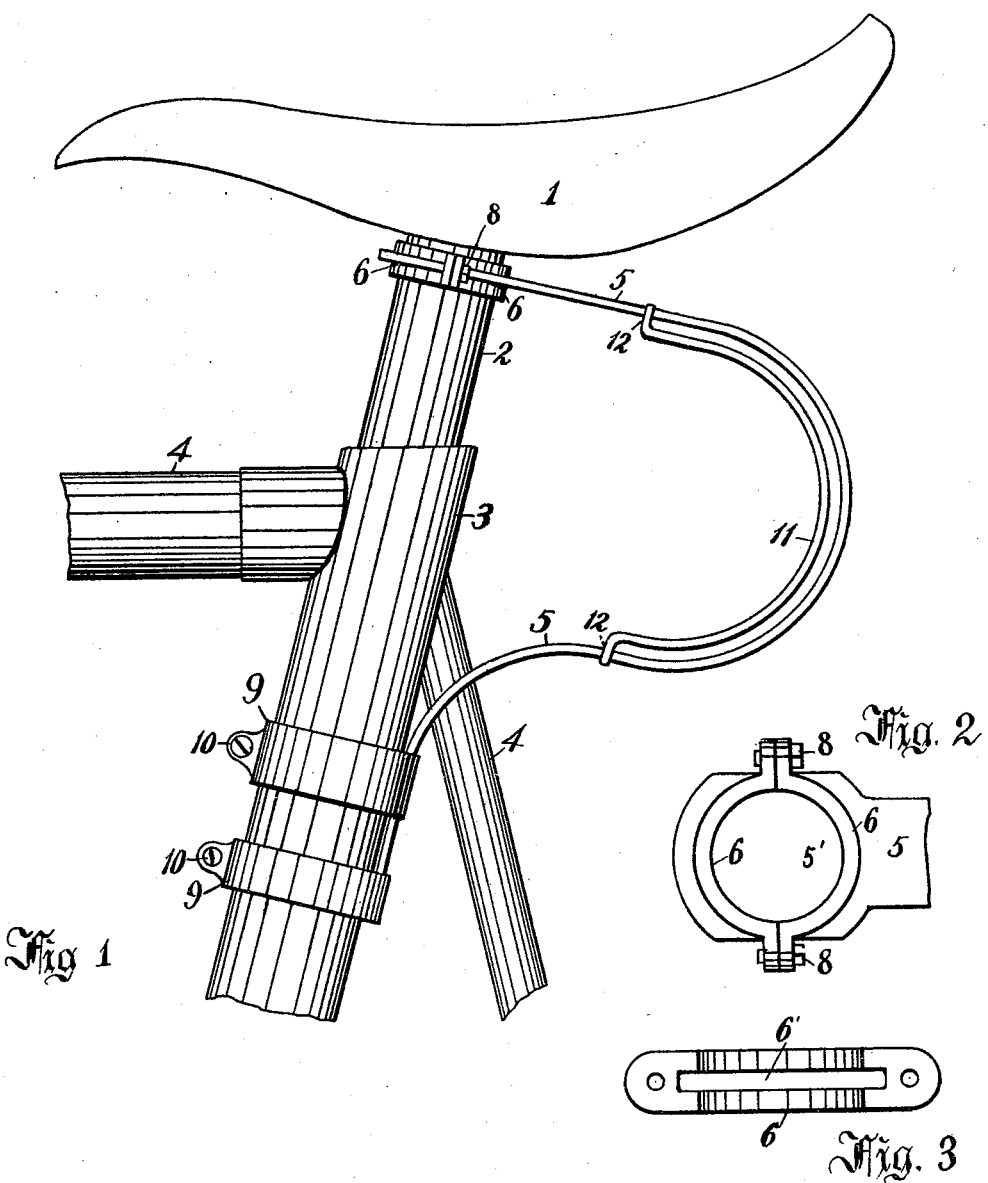

CHARLES H. LITTLE, OF SAGINAW, MICHIGAN.

SPRING ATTACHMENT FOR BICYCLE-SADDLES.

SPECIFICATION forming part of Letters Patent No. 584,944, dated June 22, 1897.

Application filed May 15, 1896. Serial No. 591,662. (No model.)

*To all whom it may concern:*

Be it known that I, CHARLES H. LITTLE, a citizen of the United States, residing at Saginaw, in the county of Saginaw and State of Michigan, have invented a certain new and useful Spring Attachment for Bicycle-Saddles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to bicycles, and is a spring attachment for a bicycle-post, its object being to provide a spring between the saddle and the frame to receive the jolt or jar upon the frame as the bicycle passes over an obstruction, whereby the vibration of the saddle will be materially lessened, if not overcome.

Figure 1 is a side elevation of a bicycle seat and frame in part provided with my invention. Fig. 2 is a plan of the upper clip connection. Fig. 3 is a detail of clip 6.

1 is the saddle of the bicycle, and may be of any form, construction, or design desired.

2 is the saddle-post, depending from the under side of the saddle and entering the tube 3 of the frame, the tube forming a socket for the post, as is common.

4 4 are other parts of the frame.

5 is a spring in which my invention chiefly consists. It is adjustably secured to the saddle-post 2 by the clip 6. The top end of the spring 5 has a hole 5', larger than the saddle-post, and through which the saddle-post passes after the end of the spring has been passed through the slot 6' in the clip 6. Upon the other side of the saddle-post and over the outer end of the spring 5 the other half of the clip 6 is passed, the end of the spring passing through the slot 6'. The two ends of the clip are then secured together and to the saddle-post by the bolts 8. Any other means for securing the upper end of the spring 5 to the saddle-post may be employed. The lower end of the spring is secured by the clip 9 to the frame or tube 3 and clamped thereto by the bolt or screw 10.

Two clips may be employed, as shown, for securing the lower end of the spring to the frame, thus adding strength to the spring. These clips 6 and 9 may be lined with rubber or other soft material to prevent rubbing or marring the finish.

11 is a leaf-spring placed inside of the spring 5 for the purpose of strengthening it, if necessary, or helping to resist a heavy weight upon the saddle. It engages the spring 5 at points 12 loosely, so as to slip along the spring 5 when bent by pressure.

It is obvious that the clip 9 may be adjusted up and down the frame 3 to raise or lower the seat, or the clip 6 may be adjusted up and down on the post 2 for the same purpose, care being had, of course, that the post 2 extends the proper distance into the tube 3 so as not to be thrown out by the vibration of the spring.

I do not wish to confine myself to any particular form or shape of spring or method of securing it to the saddle-post and frame, and any change may be made suggested by mechanical skill without departing from the principle of my invention.

Having thus described my invention, what I claim as new, and desire to secure by Letters Patent, is—

1. A spring attachment for bicycle-saddle posts comprising a spring adapted to be secured at one end to the saddle-post above the socket, the other end of the spring secured to the frame of the bicycle below the socket, whereby as the strain is put upon the spring the saddle-post will move up and down in the socket, as specified.

2. A spring-support for bicycle-saddles comprising a C-shaped spring connected to the saddle-post above the socket, the other end adjustably secured by means of clips to the bicycle-frame below the socket, whereby the saddle-post will travel freely up and down in the socket as a tension is placed upon the spring, as specified.

In testimony whereof I hereunto affix my signature in the presence of two witnesses.

CHARLES H. LITTLE.

Witnesses:
 A. H. SWARTHOUT,
 FANNIE ROBBINS.